No. 738,630. PATENTED SEPT. 8, 1903.
J. P. RUMMEL.
FILTER.
APPLICATION FILED FEB. 21, 1903.
NO MODEL.
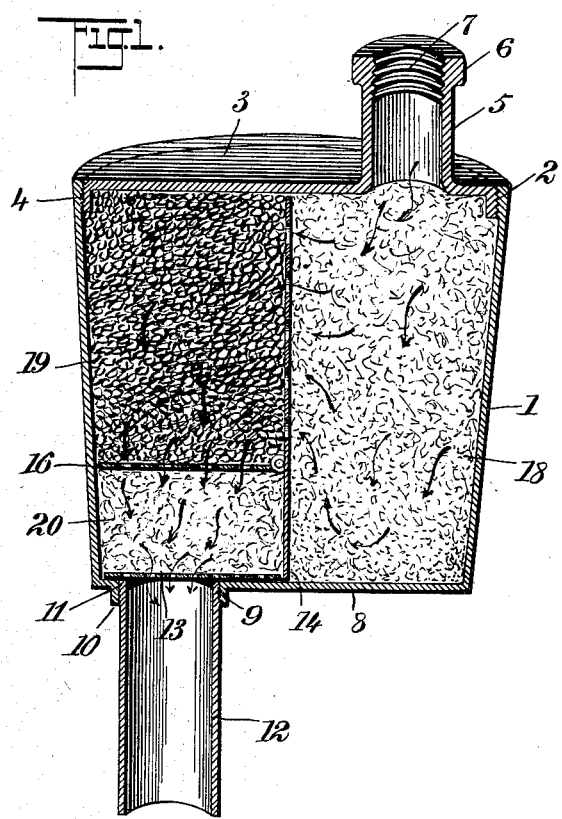
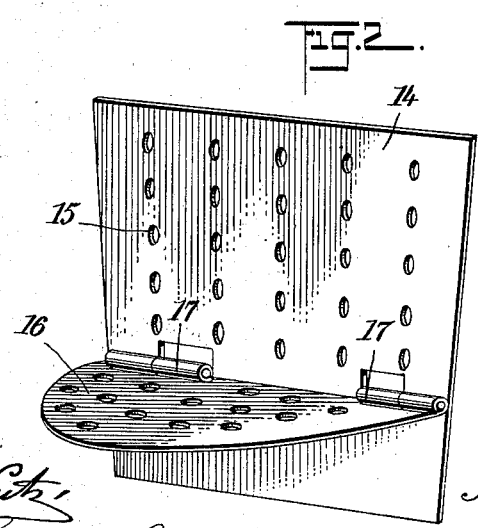
WITNESSES:
INVENTOR
Jacob P. Rummel
BY
ATTORNEYS.

No. 738,630. Patented September 8, 1903.

UNITED STATES PATENT OFFICE.

JACOB P. RUMMEL, OF SIOUX FALLS, SOUTH DAKOTA.

FILTER.

SPECIFICATION forming part of Letters Patent No. 738,630, dated September 8, 1903.

Application filed February 21, 1903. Serial No. 144,440. (No model.)

*To all whom it may concern:*

Be it known that I, JACOB P. RUMMEL, a citizen of the United States, and a resident of Sioux Falls, in the county of Minnehaha and State of South Dakota, have invented new and useful Improvements in Filters, of which the following is a full, clear, and exact description.

This invention relates to certain novel and useful improvements in filters, and has particular application to the construction of an article of this character adapted for general household use.

One of the principal objects of my invention is to provide a filter which shall separate and purify the water passing through the same of all animal matter, sediment, or the like.

A further object of the invention is to construct a filter which may be easily and quickly attached to a faucet, hydrant, spout, or the like and which shall perform its proper functions without requiring further attention.

A further object of the invention is to divide the chamber of the filter into various sections through the medium of an improved partition or diaphragm and to fill or pack said chamber with certain purifying and cleansing materials which shall remove all foreign substances passing through the same.

To the accomplishment of the above-recited ends and others of a similar nature, my invention consists in the construction, combination, and arrangement of parts, as is herein described in this specification, delineated in the accompanying drawings, and set forth in the appended claims.

Reference is to be had to the accompanying drawings, forming a part of this specification, in which similar characters of reference indicate corresponding parts in both the figures.

Figure 1 is a vertical sectional view taken through a filter embodying my improvements, and Fig. 2 is a perspective view of my improved diaphragm used in connection with the filter illustrated in Fig. 1.

In the accompanying drawings, wherein I have illustrated one particular form of my invention, 1 designates the main body portion or wall of a filter or casing, which is screw-threaded, as at 2, at its upper edge to permit the top portion 3, which is similarly screw-threaded around its periphery, as at 4, to be jointed or connected therewith. This top portion 3 is provided with an upwardly-extending short tubular portion or neck 5, having at its upper end a flange 6, the interior wall of said neck at such flanged portion being threaded, as at 7, to permit the filter to be attached by said neck to a faucet, spout, or the like. The bottom portion 8 of said casing is provided with an opening 9, preferably formed diametrically opposite to the neck of the cover portion of the filter, such opening 9 having a downwardly-extending annular flange 10 surrounding the same, which flange is screw-threaded to receive one end 11 of the discharge-pipe for the clear or purified water, which pipe is shown at 12. Over the mouth of this discharge-tube 12 is placed a perforated or foraminous screen-like sheet 13, and extending upward approximately from the side of said screen nearest to the center of the casing is a similarly orificed or foraminous diaphragm 14, which extends centrally of the casing. The construction of this screen 14 is more clearly shown in Fig. 2. As will be observed by reference to said figure, the greater portion of the surface of the diaphragm or partition is apertured or orificed, as shown at 15, the apertures extending approximately two-thirds of the surface of the plate. Extending transversely of the diaphragm, immediately beneath the last row of orifices therein, is an apertured plate 16, cut or shaped to conform to the contour of the wall of the casing, such plate being hinged or pivoted, as at 17, to the diaphragm, the portion of said diaphragm beneath the hinge being solid or imperforate. When mounted in its operative position inside the casing, the diaphragm 14 is arranged vertically, having its lower end preferably abutting against the edge of the foraminous plate 13, and the perforated hinged plate 16 is swung into a lateral or horizontal position and extends approximately parallel with the aforesaid plate 13 to a point in contact or abutment with the interior of the wall of the casing.

For the purpose of thoroughly cleaning the water which flows from the faucet through the neck 7 I fill the space between the partition and the wall of the casing adjacent to said neck with a suitable cleansing material, such as mineral wool 18, the packing extending from the neck of the filter to the base 8 thereof. Within the space on the opposite side of the partition from the mineral wool and between the top or cover of the filter and the horizontally-extending hinged plate 16 I provide a packing of filtering material composed, preferably, of charcoal 19, and in the space between the hinged plate and the foraminous plate 13 I also place a second packing of mineral wool 20, although in some instances, if desired, this space may be left empty. It will therefore be seen that each of the three chambers of the casing, which are formed by the partition described, is filled with a purifying cleansing material, which insures that injurious contaminating substances carried by the water will be removed from the same before the latter is used. The course of the water is shown by the arrows, it first passing through the neck and through the mineral wool 18, thence through the perforations 15 in the vertical partition or diaphragm, flows or percolates through the charcoal, and thence passes through the perforated hinged plate 16, through the mineral wool beneath the same, and, finally, through the perforated plate 13 and tube 12 to the point of use.

It will be evident that I have devised a filter which embodies the essential features of simplicity and cheapness, while at the same time it is extremely well adapted for household use, especially in cleaning drinking-water.

While I have shown and described one particular embodiment of my invention, I wish it to be understood that I do not limit myself to the precise details of construction shown herein, as there may be modifications and variations in some respects without departing from the principle of the invention or sacrificing any of the features thereof.

Having thus described my invention, I claim as new and desire to secure by Letters Patent—

1. A filter comprising a casing, a removable partition therefor, perforated a portion of its length, dividing the casing into chambers, a perforated plate secured to said partition beneath the last perforations therein, the portion of the partition beneath said plate being imperforate, and purifying material arranged within said casing, substantially as set forth.

2. A filter comprising a casing, having an inlet and an outlet, a perforated plate above said outlet, a partition dividing said casing into chambers, the greater portion of said partition being perforated, a perforated plate hinged to said partition above the imperforate portion thereof, the construction being such that the casing is further divided into chambers, mineral wool arranged within the chamber immediately beneath the water-inlet, charcoal arranged above the hinged plate, and mineral wool arranged beneath said hinged plate and above the perforated plate covering the outlet, the mineral wool and the charcoal being adapted to cleanse the water passing through the casing, substantially as set forth.

In testimony whereof I have signed my name to this specification in the presence of two subscribing witnesses.

JACOB P. RUMMEL.

Witnesses:
  C. A. CHRISTOPHERSON,
  H. G. PERRY.